United States Patent
Ahn et al.

(10) Patent No.: US 11,442,212 B2
(45) Date of Patent: Sep. 13, 2022

(54) OPTICAL FIBER ILLUMINATION APPARATUS

(71) Applicants: Hyundai Motor Company, Seoul (KR); Kia Motors Corporation, Seoul (KR)

(72) Inventors: Byoung Suk Ahn, Gwacheon-Si (KR); Ki Hong Lee, Seoul (KR); Jung Wook Lim, Seoul (KR); Seung Sik Han, Hwaseong-si (KR); Ji Yeon Kim, Gyeongsan-si (KR); Jin Hee Yu, Gyeongsan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 17/095,237

(22) Filed: Nov. 11, 2020

(65) Prior Publication Data

US 2022/0026617 A1 Jan. 27, 2022

(30) Foreign Application Priority Data

Jul. 21, 2020 (KR) .................. 10-2020-0090483

(51) Int. Cl.
*F21V 8/00* (2006.01)
*G02B 6/42* (2006.01)
*F21S 43/237* (2018.01)
*G02B 6/38* (2006.01)

(52) U.S. Cl.
CPC ............ *G02B 6/001* (2013.01); *F21S 43/237* (2018.01); *G02B 6/0006* (2013.01); *G02B 6/4257* (2013.01); *F21V 2200/10* (2015.01); *G02B 6/3861* (2013.01)

(58) Field of Classification Search
None
See application file for complete search history.

(56) References Cited

U.S. PATENT DOCUMENTS

| 5,345,531 | A * | 9/1994 | Keplinger | G02B 6/001 |
| | | | | 385/115 |
| 7,241,039 | B2 * | 7/2007 | Hulse | F21K 9/00 |
| | | | | 362/555 |
| 8,136,959 | B2 * | 3/2012 | Ho | F21V 17/10 |
| | | | | 362/616 |
| 8,556,484 | B2 * | 10/2013 | Ho | F21L 4/00 |
| | | | | 362/555 |
| 8,620,123 | B2 * | 12/2013 | Dean, Jr. | G02B 6/00 |
| | | | | 385/100 |
| 9,897,736 | B2 * | 2/2018 | Thorailler | B60Q 3/64 |
| 10,684,006 | B1 * | 6/2020 | Dunbar | F21V 33/00 |
| 11,187,840 | B1 * | 11/2021 | Ahn | G02B 6/0005 |

(Continued)

FOREIGN PATENT DOCUMENTS

| EP | 3311064 A1 | 4/2018 |
| JP | 2005-019155 A | 1/2005 |

(Continued)

*Primary Examiner* — Jerry Rahll

(74) *Attorney, Agent, or Firm* — Morgan, Lewis & Bockius LLP

(57) ABSTRACT

Disclosed is an optical fiber illumination apparatus configured for ensuring high light efficiency and uniform luminosity when displaying an illumination pattern with flexible optical fibers in fiber optic lighting.

20 Claims, 8 Drawing Sheets

(56) References Cited

U.S. PATENT DOCUMENTS

| | | | |
|---|---|---|---|
| 2005/0157992 A1* | 7/2005 | Peng | G02B 6/0008 |
| | | | 385/115 |
| 2007/0009210 A1* | 1/2007 | Hulse | F21K 9/65 |
| | | | 359/326 |
| 2010/0232175 A1* | 9/2010 | Ho | G02B 6/001 |
| | | | 362/551 |
| 2013/0209045 A1* | 8/2013 | Dean, Jr. | G02B 6/443 |
| | | | 385/113 |
| 2016/0299276 A1* | 10/2016 | Yamamoto | G02B 6/001 |
| 2022/0026617 A1* | 1/2022 | Ahn | G02B 6/3861 |

FOREIGN PATENT DOCUMENTS

| | | |
|---|---|---|
| KR | 10-2014-0109665 | 9/2014 |
| WO | WO 2016/204779 A1 | 12/2016 |

\* cited by examiner

OPTICAL FIBER ILLUMINATION APPARATUS

CROSS REFERENCE TO RELATED APPLICATION

The present application claims priority to Korean Patent Application No. 10-2020-0090483, filed Jul. 21, 2020, the entire contents of which is incorporated herein for all purposes by this reference.

BACKGROUND OF THE INVENTION

Field of the Invention

The present invention relates to an optical fiber illumination apparatus capable of ensuring high light efficiency and uniform luminosity when displaying an illumination pattern with flexible optical fibers in fiber optic lighting.

Description of Related Art

Vehicles are provided with lamp apparatuses that help a driver secure good forward visibility when driving at night and for informing other vehicle drivers or nearby pedestrians of the driving conditions thereof.

The primary role of the lamp apparatuses is lighting, but the lamp apparatuses also function as components affecting aesthetic impression of vehicles. That is, since impression of a vehicle can change according to an illumination pattern implemented with a lamp apparatus, it is necessary to improve the design of an illumination pattern formed by a lamp apparatus.

Accordingly, various lamp apparatuses using optical fibers have recently been developed. Optical fibers are flexible and configured for transmitting light therethrough when the light is introduced into the optical fibers. Due to these characteristics, various illumination patterns may be made with optical fibers.

However, since optical fibers for lighting mostly come in a long cable shape, the brightness may locally vary in a longitudinal direction when an optical fiber transmits light. In that case, the commodity of optical fiber lamps degrades due to the luminosity irregularity. Furthermore, since optical fibers are not rigid but flexible, the optical fibers may not be positioned in place and may be easily displaced when impacted. Therefore, a measure for fixing optical fibers at predetermined positions is required.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an optical fiber illumination apparatus having high light efficiency and uniform luminosity and being configured for displaying various illumination patterns with optical fibers.

According to various aspects of the present invention, there is provided an optical fiber illumination apparatus including a light source module, a guide unit, and a fixing unit. The light source module includes a light source configured to emit light and a group of optical fibers, each being configured to transmit the light introduced thereinto from the light source. The guide unit longitudinally extends and is configured to fix arrangement and positions of the optical fibers arranged on an external surface thereof, facilitating an illumination pattern to be displayed by the optical fibers. The fixing unit is disposed between the light source module and the guide unit and makes the optical fibers arranged at predetermined intervals in a circumferential direction of the guide unit.

The light source module may include: a bracket on a first side of which the light source is disposed; and a ferrule disposed on a second side of the bracket in a manner to face the light source. The ferrule is configured such that a first end portion of each of the plurality of optical fibers is sheathed into the ferrule, binding the first end portions of the respective optical fibers.

The bracket may include a first bracket portion and a second bracket portion. Each of the first and second bracket portions may include a first installation end portion that the light source is installed and a second installation end portion which is bent and continuous from the first installation end portion and at which the ferrule is installed. When the first and second bracket portions are assembled to form the bracket, the respective second installation end portions of the first and second bracket portions are coupled to each other and surround the ferrule. The light source may be installed on one side of the first installation end portions so that the light source faces the ferrule.

The ferrule may have a cavity into which a first end portion of each of the optical fibers is inserted and a through-hole formed in a flank portion thereof.

In a state where the first end portions of the respective optical fibers are disposed in the cavity of the ferrule, adhesive may be injected into the cavity through the through-hole so that the first end portions of the respective optical fibers are fixed in the cavity.

The guide unit may include a resting portion at a position where an illumination pattern is to be formed, in which each of the optical fibers is fixedly disposed at the resting portion.

The resting portion may include a plurality of protrusions and the optical fibers are disposed between each of the protrusions.

The light source module may include: a first light source, a group of first optical fibers onto which light emitted from the first light source is incident, a second light source, and a group op second optical fibers onto which light emitted from the second light source is incident, in which each of the first optical fibers and each of the second optical fibers of the second group are wound around an external surface of the guide unit in opposite directions to intersect each other.

The guide unit may have a resting portion on which the first optical fibers and the second optical fibers are fixedly disposed, in a region where the predetermined illumination pattern is to be displayed.

The resting portion may include multiple fitting protrusions each of which extends in a direction in which the first optical fibers extend, and the fitting protrusions may be disposed side by side to define an accommodation groove between each of the fitting protrusions.

Each of the fitting protrusions may include multiple recesses in which the respective second optical fibers are disposed in a manner to be spaced from each other.

In the resting portion, the depth of the accommodation grooves defined between each of the fitting protrusions and the depth of the recesses formed in each of the fitting protrusions may greater than the diameter of the first optical fibers, or the accommodation grooves and the recesses may be formed at different heights, in which a difference between the heights is equal to the diameter of the first optical fibers.

The guide unit may be provided with a joint bracket with fixing grooves in which the respective optical fibers are disposed, in which the joint bracket is disposed in a region where an illumination pattern is not displayed.

The fixing unit may include: a fixing portion coupled to the guide unit and provided with multiple insertion holes into which the respective optical fibers are inserted; and a cover portion disposed to cover the fixing portion in a state in which the optical fibers are respectively inserted into the insertion holes and thus aligned with each other.

The cover portion may include a first cap and a second cop, and each of the first and second caps is provided with an arc-shaped opening extending in a circumferential direction so that the optical fibers pass through each opening.

The fixing unit may include a light shielding film disposed on the cover portion and configured to prevent light leaking from a portion of the optical fiber between the light source module and the fixing unit from entering the guide unit.

As to the multiple optical fibers, a portion of each optical fiber disposed between the light source and the fixing unit is the same.

An optical fiber illumination apparatus may include: a fixation bracket with a first end portion and a second end portion spaced from each other; a light source module disposed at the first end portion of the fixation bracket and configured to include a light source emitting emit light and a group of optical fibers that illuminate when the light emitted from the light source is incident onto the optical fibers; a guide unit extending to be connected to the first end portion and the second end portion of the fixation bracket, and configured to fix arrangement and positions of the optical fibers so that an illumination pattern may be implemented; and two fixing units provided at the first end portion and the second end portion of the fixation brackets, respectively, and configured to align the optical fibers in a manner to be spaced from each other.

The guide unit may be provided with a resting portion including plurality of protrusions in a region where an illumination pattern is to be displayed, in which the optical fibers are disposed between each of the protrusions not to be displaced once installed.

The fixing unit provided at the second end portion of the fixation bracket is provided with a reflective portion to be in contact with an end portion of each of the optical fibers.

The optical fiber illumination apparatus structured as described above ensures high light efficiency and luminosity uniformity when lighting with optical fibers and can display various illumination patterns using flexible optical fibers.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objectives, features, and other advantages of the present invention

Figure 1:
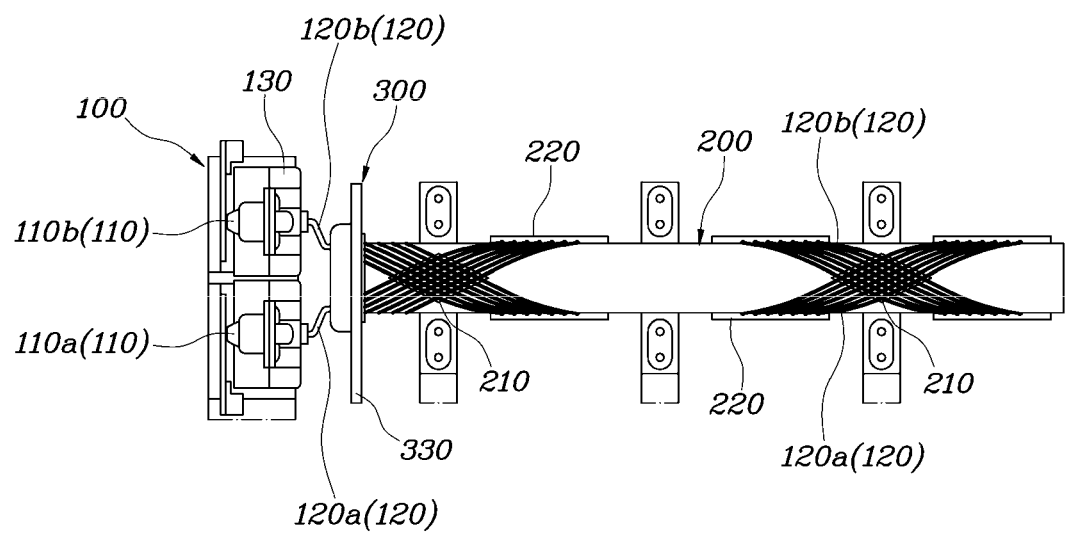
FIG. 1 is a diagram illustrating an optical fiber illumination apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an optical fiber illumination apparatus according to exemplary embodiments of the present invention will be described with reference to the accompanying drawings.

Figure 2:
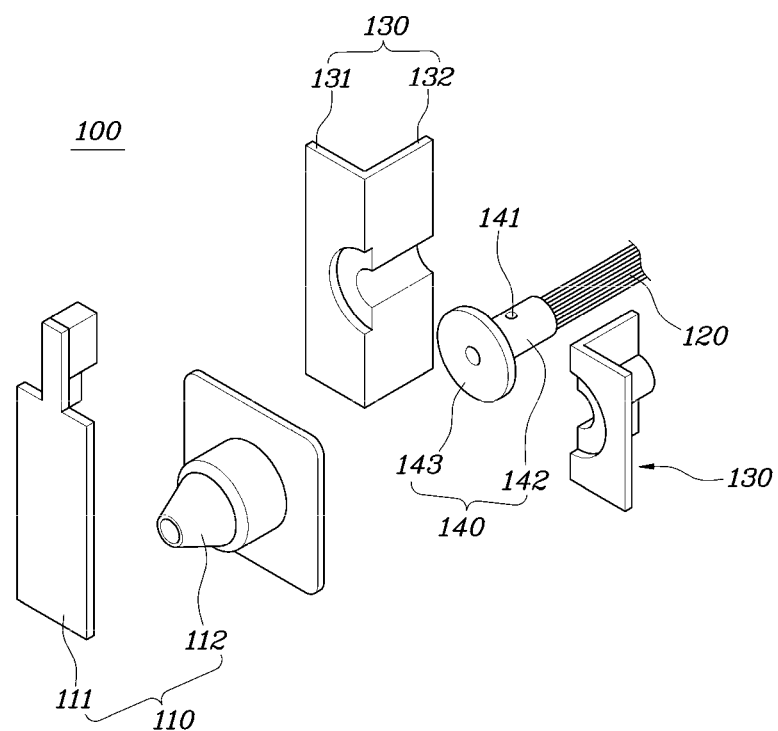
FIG. 2 and FIG. 3 are diagrams illustrating a light source module included in the optical fiber illumination apparatus of FIG. 1.
Figure 3:
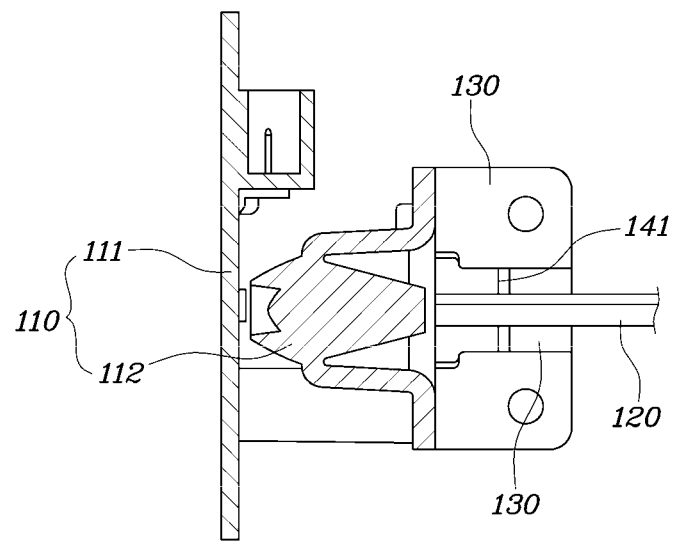
Figure 4:
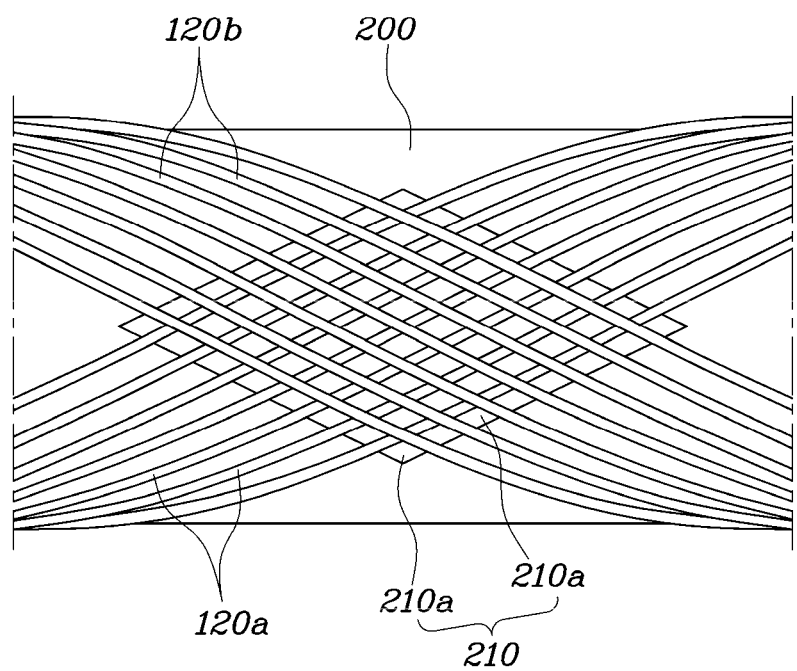
FIG. 4 is a diagram illustrating a guide unit according to various exemplary embodiments of the present invention, which is included in the optical fiber illumination apparatus illustrated in FIG. 1.
Figure 5:
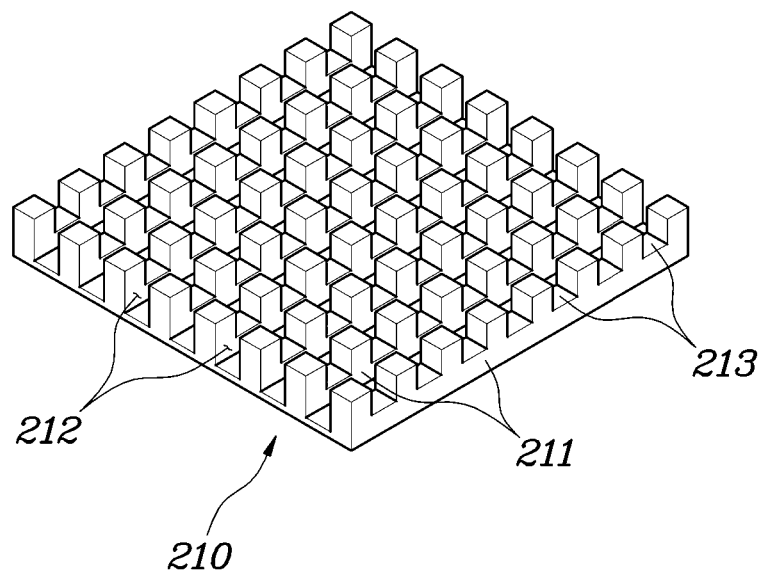
FIG. 5 is a diagram illustrating a guide unit according to another exemplary embodiment of the present invention, which is included in the optical fiber illumination apparatus illustrated in FIG. 1.
Figure 6:
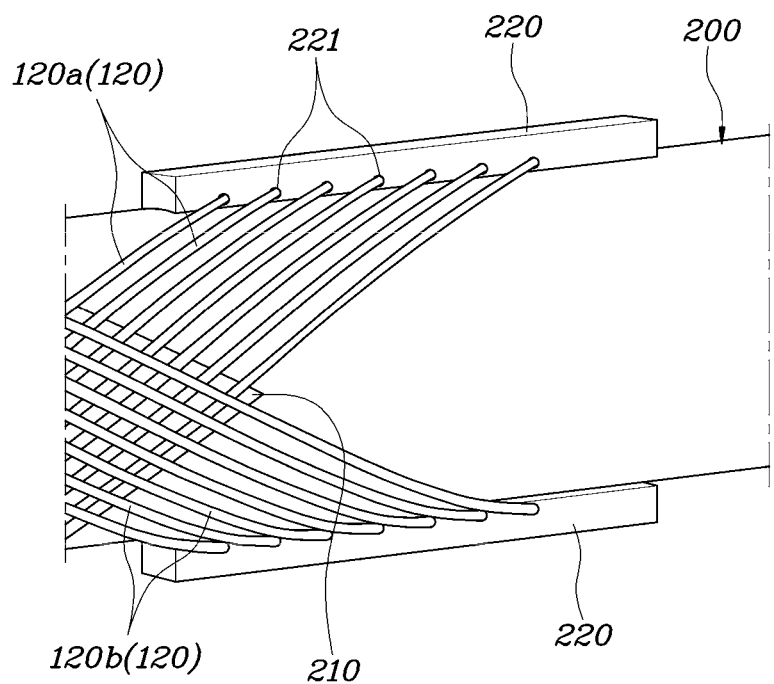
FIG. 6 is a diagram illustrating a guide unit included in the optical fiber illumination apparatus illustrated in FIG. 1.
Figure 7:
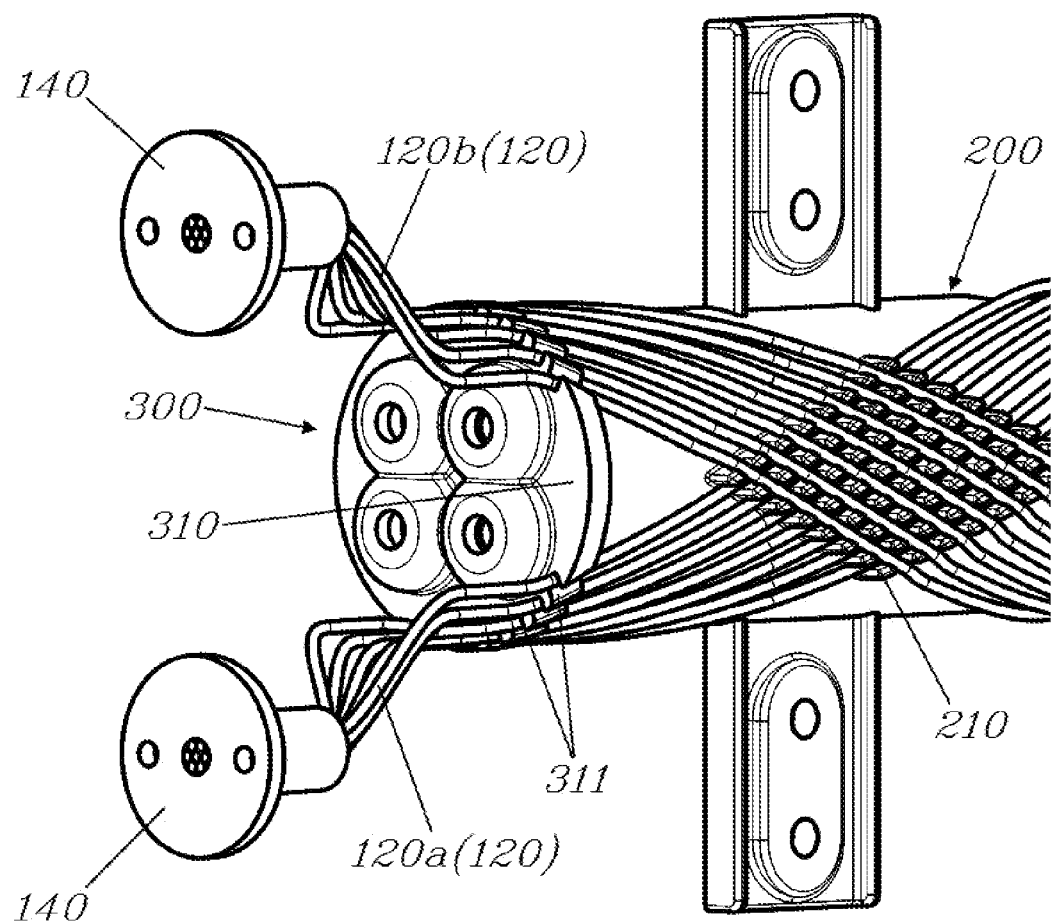
FIG. 7, FIG. 8 and FIG. 9 are diagrams illustrating a fixing unit included in the optical fiber illumination apparatus illustrated in FIG. 1.
Figure 8:
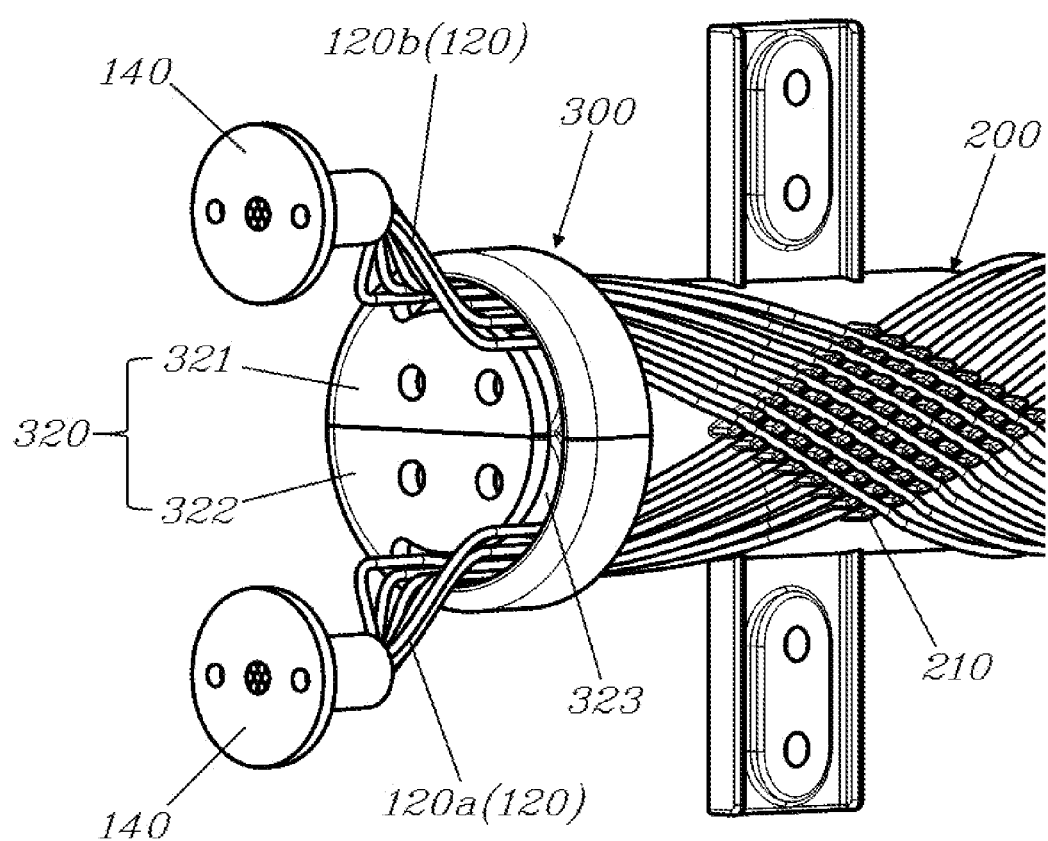
Figure 9:
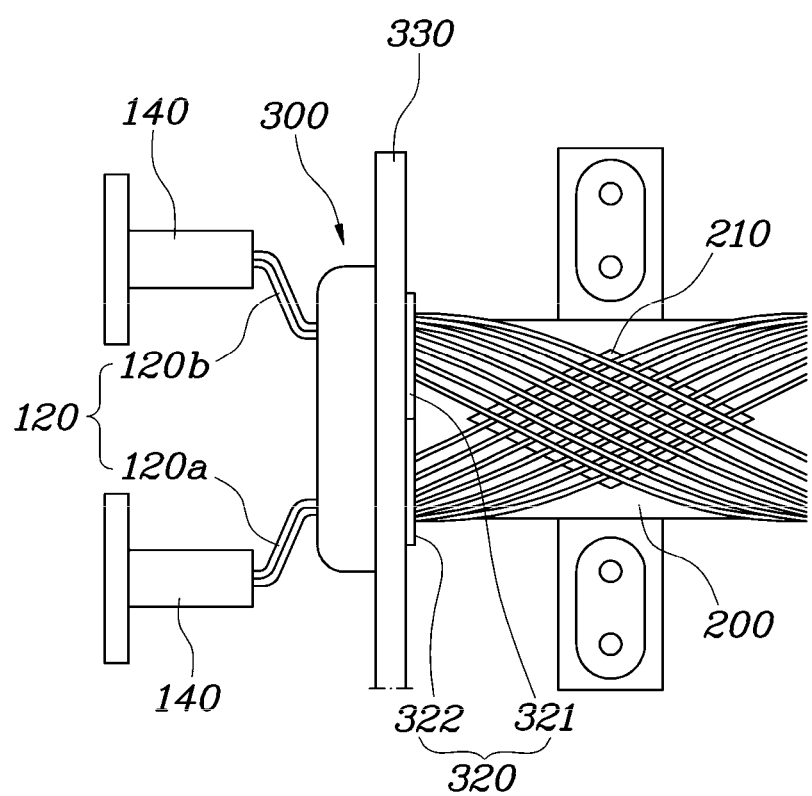
Figure 10:
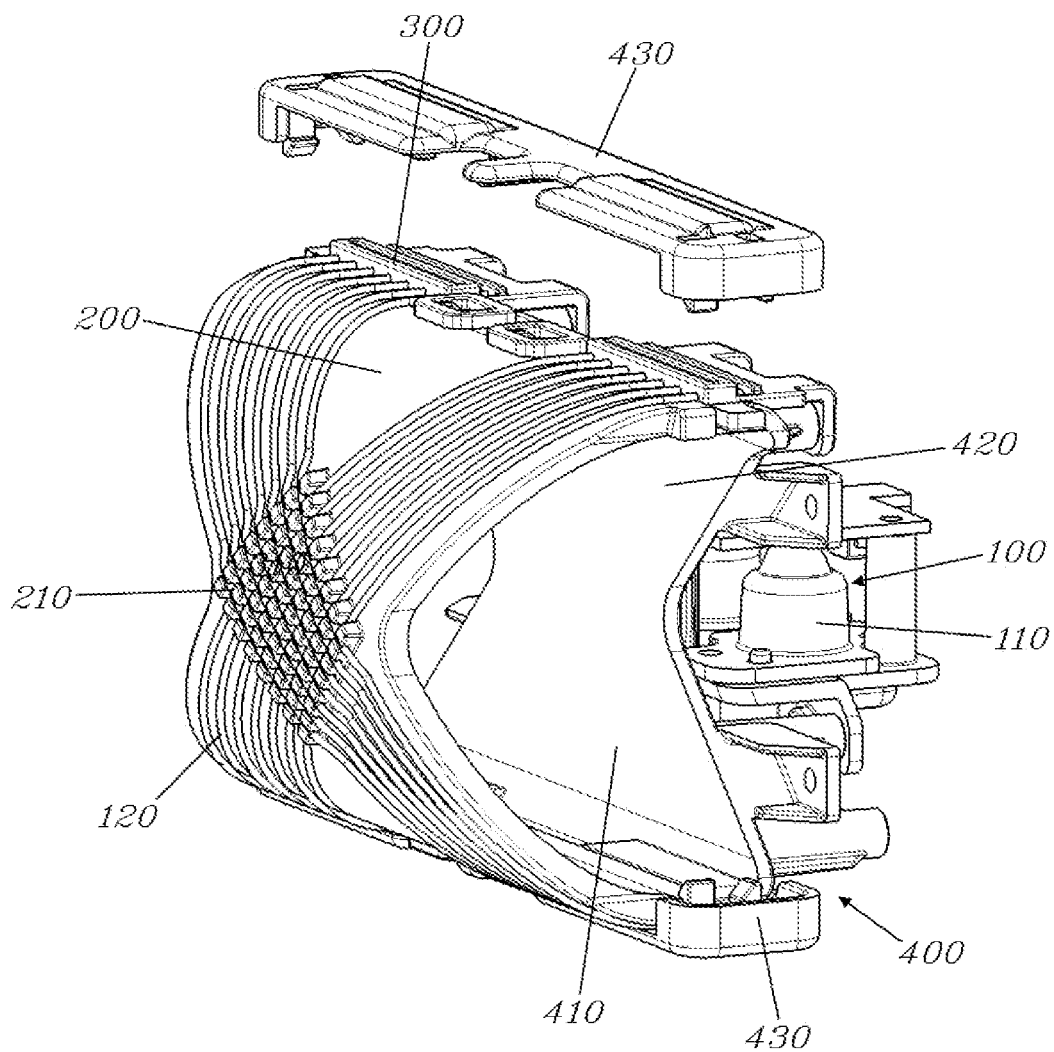
FIG. 10, FIG. 11, and FIG. 12 are diagrams illustrating an optical fiber illumination apparatus according to various exemplary embodiments of the present invention.
Figure 11:
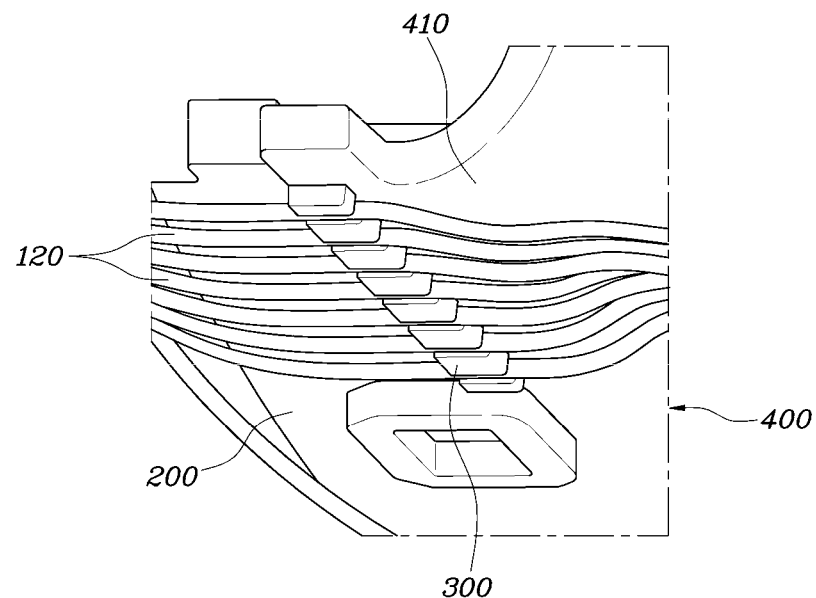
Figure 12:
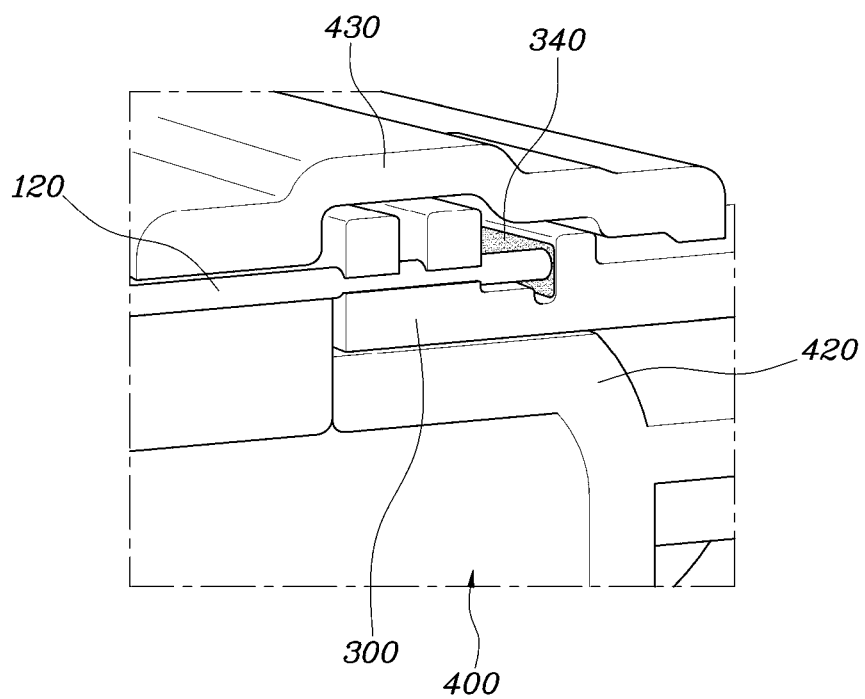

FIG. 1 is a diagram illustrating an optical fiber illumination apparatus according to various exemplary embodiments of the present invention. FIG. 2 and FIG. 3 are diagrams illustrating a light source module included in the optical fiber illumination apparatus illustrated in FIG. 1. FIG. 4 is a diagram illustrating a guide unit according to various exemplary embodiments of the present invention, which is included in the optical fiber illumination apparatus illustrated in FIG. 1. FIG. 5 is a diagram illustrating a guide unit according to another exemplary embodiment of the present invention, which is included in the optical fiber illumination apparatus illustrated in FIG. 1. FIG. 6 is a diagram illustrating a guide unit included the optical fiber illumination apparatus illustrated in FIG. 1. FIG. 7, FIG. 8 and FIG. 9 are diagrams illustrating a fixing unit included in the optical fiber illumination apparatus illustrated in FIG. 1. FIG. 10, FIG. 11, and FIG. 12 are diagrams illustrating an optical fiber illumination apparatus according to various exemplary embodiments of the present invention.

Referring to FIG. 1, an optical fiber illumination apparatus according to various exemplary embodiments of the present invention includes a light source module 100, a guide unit 200, and a fixing unit 300. The light source module 100 includes a light source 110 that emits light and a group of plurality of optical fibers that transmit the light received from the light source 10 in a longitudinal direction thereof. The guide unit 200 extends in a longitudinal direction of the illumination apparatus and determines and fixes the arrangement and positions of the optical fibers 120 such that an illumination pattern is displayed. The fixing unit 300 is disposed between the light source module 100 and the guide unit 200 such that the optical fibers 120 are arranged to be spaced from each other on an external surface of the guide unit 200.

Here, an LED may be used as the light source 110 of the light source module 100. When light emitted by the light source 110 is incident onto the optical group of optical fibers 120, the group of optical fibers 120 transmits the light. The optical fiber 120 is made of glass or polymer resin. Therefore, the optical fiber 120 is flexible, deformable, and shape-recoverable. The plurality of optical fibers 120 are fixed by the guide unit 200. The arrangement and positions of the plurality of optical fibers 120 are determined such that a predetermined illumination pattern may be displayed when the optical fibers 120 transmit light therethrough.

The guide unit 200 is a component for implementing an illumination pattern. The guide unit 200 longitudinally extends and the optical fiber is wound around the guide unit 200 in a form of a specific pattern corresponding to the illumination pattern to be displayed. Thus, when the optical fiber 20 transmits light, an illumination pattern is displayed. Furthermore, since the plurality of optical fibers 120 are aligned by the fixing unit 300 disposed between the light source module 100 and the guide unit 200, the illumination pattern is implemented by the plurality of optical fibers 120. Since the plurality of optical fibers 120 are arranged at regular intervals and fixed by the fixing unit 300, the optical fibers 120 illuminate the overall uniform intensity of light over its length. Therefore, the commodity value of the optical fiber lamp apparatus is improved.

As described above, when an illumination pattern is implemented with the optical fibers 120, the illumination pattern to be displayed by the optical fibers 120 is determined by the guide unit 200. Since the plurality of optical fibers 120 are aligned in parallel by the fixing unit 300, each of the optical fibers 120 uniformly illuminates, implementing an illumination pattern with high quality.

The present invention will be described in more detail below. As illustrated in FIG. 2, the light source module 100 includes a bracket 130 and a ferrule 140. The light source 110 is mounted on a first side of the bracket 130 and the ferrule 140 is disposed on a second side of the bracket 130. A first end portion of each of the optical fibers 120 is fixed by the ferrule 140 to form a bundle of fibers such that the first end portions of the respective optical fibers 120 are sheathed into the ferrule 140.

That, the light source module 100 includes the bracket 130 and the ferrule 140 used to install the light source 110 and the optical fibers 120. That is, the light source 110 is installed on the first side of the bracket 130 and the optical fibers 120 are installed on the second side of the bracket 130. Here, the optical fibers 120 are bound by the ferrule to form an optical fiber bundle. Thus, the optical fiber bundle is coupled to the bracket 130 with the help of the ferrule 140. Here, the light source 110 includes an LED mounted on a printed circuit board (PCB) 111 and a condensing lens 112. Therefore, the condensing lens 112 is configured to make the light emitted from the light source 110 focused on the optical fiber 120.

As illustrated in FIG. 3, the bracket 130 includes a first bracket portion and a second bracket portion. Each of the first and second bracket portions includes a first installation end portion 131 and a second installation end portion 132 which is at a predetermined angle with respect to the first installation end portion 131. When the first installation end portion 131 and the second installation end portion 132 are combined to form one of the first and second bracket portions in a manner to surround and fix the ferrule 140. The light source 110 is disposed on one side of the first installation end portion 131, and the light source 110 and the ferrule 140 are positioned to face each other. Since the bracket 130 is configured by assembling the first and second bracket portions with each other, it is easy to install the light source 110 and the ferrule 140. Here, each of the first and second bracket portions of the bracket 130 has a bent shape (for example, letter L-shape). Thus, the first and second brackets combined to form the bracket 130, the second installation end portions 132 are in contact with the ferrule 140. The bracket 130 surrounds and fixes the ferrule 140. The first installation end portion 131 provides a surface on which the light source 110 is mounted. Accordingly, the second installation end portion 132 is provided with a groove in the shape of a half of the ferrule 140. Thus, the respective second installation end portions 132 of the first and second bracket portions are bolted or riveted to be assembled, and the ferrule 140 is received in the grooves facing each other. The light source 110 is bolted or riveted to the first installation end portion 131.

On the other hand, as illustrated in FIG. 2 and FIG. 3, the ferrule 140 is provided with a cavity 141 through which the optical fibers 120 pass. Accordingly, adhesive is injected into the cavity 141 through a through-hole 141 of the ferrule 140 in a state in which a first end portion of each of the optical fibers 120 is inserted into the cavity 141 of the ferrule 140.

The ferrule 140 includes a hollow cylinder 142 and a flange 143 that restricts the longitudinal movement of the hollow cylinder 142. The respective first end portions of the plurality of optical fibers 120 are sheathed into the cavity of the ferrule 140. The first end portions of the respective optical fibers 120, which are received into the cavity of the ferrule 140, are fixed by an adhesive material injected into the cavity 141 of the ferrule 140 through the through-hole 141 formed in the flank portion of the ferrule 140.

That is, since the light source 110 is disposed on one side of the bracket 130 and the optical fibers 120 are disposed on another side of the bracket 130 via the ferrule 140. Therefore, the assembly tolerance between each part is minimized. Furthermore, since the light emitted from the light source 110 is surely introduced into each of the optical fibers 120, the light efficiency improves.

On the other hand, as illustrated in FIG. 4, the guide unit 200 is provided with a resting portion 210 at a position where an illumination pattern is to be displayed. Each of the optical fibers 120 is fixedly partially disposed at the resting portion 210. Thus, within the region were the resting portion is disposed, when the optical fibers 120 transmit light therethrough, the light exits the optical fiber. Since the guide unit 200 is provided with the resting portion 210 for fixing the positions of the optical fibers 120 in a region where the predetermined illumination pattern is to be displayed, the positions of the flexible optical fibers 120 are fixed so that the illumination pattern may be maintained.

The resting portion 210 includes a plurality of protrusions 210a. Each of the optical fibers 120 is disposed to pass a gap between each of the protrusions 210a.

Therefore, since each of the optical fibers 120 is fitted between each of the protrusions 210a, the optical fibers 120 may be spaced from each other at regular intervals, and the intervals are maintained. Therefore, it is possible to prevent the optical fibers 120 from accidentally being brought into contact with each other, so that the optical fibers 120 are not damaged. The positions of the plurality of protrusions 210a of the resting portion 210 are determined according to the direction in which each of the optical fibers extends 120.

In another exemplary embodiment of the present invention, the light source module 100 includes a first light source 110a, a first group of optical fibers 120a onto which light emitted from the first light source 110a is incident, a second light source 110b, and a second group of optical fibers 120b onto which light emitted from the second light source 110b is incident. Each of the optical fibers of the first group 110a and each of the optical fibers of the second group 110b are wound around a guide unit 200 in opposite directions to intersect each other.

That is, as illustrated in FIG. 1, the light source module 100 includes multiple light sources 110 and multiple groups of optical fibers 120. The optical fibers 120 are wound around the external surface of the guide unit 200 to intersect each other so that an X-shaped illumination pattern may be obtained. Accordingly, in a region (referred to as illumination pattern region) of the guide unit 200, an X-shaped illumination pattern implemented with the first group of optical fibers 120a and the second group of optical fibers 120b intersecting each other is formed.

The guide unit 200 is provided with a resting portion 210 for fixing each of the optical fibers of the first group 120a and each of the optical fiber 120b of the second group at a position where the illumination pattern is to be displayed. Therefore, in the illumination pattern region where the predetermined illumination pattern is to be implemented with the first optical fibers 120a and the second optical fibers 120b, the position of each of the optical fibers 120a and 120b is fixed by the resting portion 120b. Therefore, the illumination pattern implemented with the first optical fibers 120a and the second optical fibers 120b is maintained. That is, in the case where the guide unit 200 is not provided with the resting portion 210, there is a possibility that the first optical fibers 120a and the second optical fibers 120b are displaced because the first optical fibers 120a and the second optical fibers 120b. However, according to the exemplary embodiment of the present invention, since the resting portion 210 fixes the positions of the first and second optical fibers 210a and 210b, the illumination pattern displayed by the first and second optical fibers 210a and 210b may be stably maintained, resulting in improvement of commodity value.

The resting portion 210 includes a plurality of fitting protrusions 211 each extending in a direction in which the first optical fiber 120a extends, and the fitting protrusions 211 are arranged side by side to form accommodation groves 212 in which the first optical fibers 120a are to be disposed.

As illustrated in FIG. 5, the resting portion unit 210 includes the plurality of fitting protrusions 211 that are spaced from each other at regular intervals and are arranged side by side so that the first optical fibers 120a are disposed in the accommodation groves 212 formed between each of the fitting protrusions 211. That is, each of the accommodation groves 212 is formed to extend in the direction in which each of the fitting protrusions 211 extends, and the first optical fibers 120a are received in the respective accommodation groves 212. Therefore, a strip-shaped illumination pattern extending in a direction of elongation of the accommodation grove 121 is implemented with each of the first optical fibers 120a.

Furthermore, the resting portion is also provided with multiple recesses 213 spaced from each other and recessed from the surface of the accommodation groves 212 such that the second optical fibers 120 are received in the respective recesses 213. With the present configuration, even though the first optical fibers 120a and the second optical fibers 120b are arranged to intersect each other, since the first optical fibers 120a are received in the respective accommodation groves 212 and the second optical fibers 120b are received in the respective second recesses 213, the first optical fibers 120a and the second optical fibers 120b are not displaced once they are installed.

The resting portion 210 is configured such that each of the depth of the accommodation groves 212 and the height of the recesses 213 is equal to equal to or greater than the diameter of the first optical fibers 120a. The accommodation groves 212 and the recesses 213 have a step difference so that the first optical fibers 120a received in the accommodation groves 212 are not contact with the second optical fibers 120b received in the recesses 213. That is, since the second optical fibers 120b are disposed in the recesses 213 and extending over the first optical fibers 120a disposed in the accommodation groves 212 defined by the fitting protrusions 211. In the present manner, each of the first optical fibers 120a and each of the second optical fibers 120b intersect each other without being in contact with each other.

As illustrated in FIG. 6, the guide unit 200 is provided with a joint bracket 220 having fixing holes 221 into which the optical fibers 120 are inserted. The joint bracket 220 is disposed at a region where no illumination pattern is to be formed. The joint bracket 220 is configured to fix the optical fibers 120 in an area region where an illumination pattern is not to be formed. The joint bracket 220 is a separate component and mounted with the guide unit 200. When the joint bracket 220 is mounted on the guide unit 200, the respective end portions of the plurality of optical fibers 120 are inserted into the respective fixing holes 221. Thus, the optical fibers 120 are disposed in a manner to be spaced from each other.

As described above, the guide unit 200 includes the resting portion 210 in the region where the predetermined illumination pattern is to be displayed, and the joint bracket 220 is disposed in the region where the predetermined illumination pattern is not to be displayed. Therefore, since the positions of the optical fibers 120 are securely fixed on the external surface of the guide unit 200, the illumination may be stably maintained.

On the other hand, as illustrated in FIGS. 7 to 9, the fixing unit 300 includes a fixing portion 310 and a cover portion 320. The fixing portion 310 is combined with the guide unit 200. The fixing portion 310 is provided with multiple insertion holes into which the plurality of optical fibers 120 are inserted, respectively. The cover portion 320 is disposed to cover the fixing portion 310 in a state in which one end portion of each of the optical fibers 120 is inserted into the insertion hole 311.

The fixing unit 300 may include the fixing portion 310 and the cover portion 320. The fixing portion 310 aligns the plurality of optical fibers 120 in a state of being coupled to the guide unit 200. The circumferential surface of the fixing portion 310 is provided with multiple insertion grooves 311 in which the respective optical fibers 120 are respectively received. Since the cover portion 320 is mounted on the fixing portion 310, the plurality of optical fibers 120 received in the respective insertion grooves 311 are not separated from the insertion grooves 311.

Here, the cover unit 320 includes a first cap portion 321 and a second cap portion 322, each of which is provided with an arc-shaped opening 323 extending in a circumferential direction thereof. The optical fibers 120 pass through the openings 323. As illustrated in FIG. 8, the cover portion 320 is an assembly of the first cap portion 321 and the second cap portion 322. Each of the first cap portion 321 and the second cap portion 322 has the opening hole 323 extending in a circumferential direction by a predetermined length in an arc shape. Therefore, it is easy to install the optical fibers 120 by passing through the opening 323 of each of the first cap portion 321 and the second cap portion 322. Here, the opening 323 formed in each of the first cap portion 321 and the second cap portion 322 extends by a predetermined length in an arc shape, is open at a first end portion, and is closed at a second end thereof. Accordingly, in a state in which each of the optical fibers 120 is inserted into a corresponding one of the insertion grooves 311 of the fixing portion 310, the first cap portion 321 is rotated so that the optical fibers 120 are inserted into the opening 323. Next, the optical fibers 120 are inserted into the opening 323 of the second cap portion 322 in the same manner, the first cap portion 321 and the second cap portion 322 are rotated. In the present way, the optical fibers 120 may be inserted into the opening 323 of each of the first cap portion 321 and the second cap portion 322. Therefore, the cover portion 320 may be combined with the fixing portion 310 without interfering with the optical fibers 120 aligned by the fixing portion 310, through the rotation of the first the first cap portion 321 and the second cap portion 322.

On the other hand, as illustrated in FIG. 9, the fixing unit 300 further includes a light shielding film 330 installed on the cover portion 320. The light shielding film 330 blocks the light introduced into the optical fiber 120 from scattering outside. When the optical fibers 120 transmit light, a portion of each of the optical fibers 120, which is mounted on the guide unit 200, is externally exposed and the illumination pattern is implemented with the exposed portions of the optical fibers 120. Therefore, of the portions of each of the optical fibers 120, the portion disposed between the light source module 100 and the fixing unit 300 is referred to as an ineffective portion and the portion disposed on the guide unit 200 is referred to as an effective portion. With the present configuration, when the light generated from the ineffective portion of the optical fiber 120 travels and reaches the effective portion, the amount of light becomes uneven within the illumination pattern region. Since the light shielding film 330 covers the cover portion 320, light scattering between the light source module 100 and the fixing unit 300 cannot travel to the guide unit 200. Therefore, the uniformity of the amount of light is secured in the effective portion of the optical fiber 120. This results in a uniform illumination pattern displayed.

Furthermore, the length of each of the optical fibers 120 between the light source 110 and the fixing unit 300 is equal to each other, so that a uniform illumination pattern may be displayed. That is, for each of the optical fibers 120, a length from its one end portion to a portion fixed by the fixing unit 300 is the same. Therefore, the uniformity of the amount of light is ensured within the effective portion of the optical fiber 120. That is, since the plurality of optical fibers 120 receive the same amount of light, the light diffuses over the same length for each of the optical fibers. Therefore, the uniformity of the amount of light being transmitted through the optical fiber is ensured.

According to various exemplary embodiments of the present invention, referring to FIGS. 10 through 12, an optical fiber illumination apparatus includes a fixation bracket 400, a light source module 100, a guide unit 200, and a fixing unit 300. One end portion (referred to as first end) 410 and the other end portion (referred to as second end) 420 are spaced from each other. The light source module 100 includes a light source 110 which is disposed at one end portion 410 of the fixation bracket 400 and emits light and a group of optical fibers 120 that transmit the light emitted from the light source when the light is incident onto the group of optical fibers 120. The guide unit 200 extends to be connected to a first end portion 410 and a second end portion 420 of the fixation bracket 400 at a first end portion and a second end portion thereof, respectively. The fixing units 300 are disposed on the first end portion 410 and the second end portion 420 of the fixation bracket 400, respectively to align the optical fibers 120 to be spaced from each other. Here, two protective coverings 430 are mounted on the first end portion 410 and the second end portion 420 of the fixation bracket 400, respectively, defining an effective portion of the optical fiber 120.

Here, the fixation bracket 400 may be installed at a location where lighting is required in a vehicle. The light source module 100 is combined with the fixation bracket 400. The first end portion 410 and the second end portion 420 of the fixation bracket 400 are spaced from each other, and the light source module 100 is installed at either one of the first and second end portions 410 and 420. The position where the light source module 100 is installed at any end portion among the first end portion 410 and the second end portion 420 of the fixation unit 400.

The guide unit 200 is a component for determining the illumination pattern. The guide unit 200 extends to be connected to the first end portion 410 and the second end portion 420 of the fixation bracket 400, and the optical fibers 120 extend in the longitudinal direction of the guide unit. Thus, an illumination pattern may be displayed when the optical fibers 120 transmit light. Since the plurality of optical fibers 120 are aligned by the fixing unit 300 disposed between the light source module 100 and the guide unit 200, the illumination pattern may be clearly displayed by the plurality of optical fibers 120. In particular, since the plurality of optical fibers 120 are aligned such that the optical fibers 120 are spaced from each other at regular intervals and equally extend portion. Therefore, the luminosity of light emitted from optical fibers 120 is uniform. Therefore, the commodity value of the lamp apparatus is improved.

As described above, when an illumination pattern is implemented with the optical fibers 120, the illumination pattern is determined by the guide unit 200. Since the plurality of optical fibers 120 are well aligned by the fixing unit 300, each of the optical fibers 120 uniformly illuminates, improving the quality of the illumination pattern.

The guide unit 200 is provided with a resting portion 210 including a plurality of protrusions 210a by which the optical fibers 120 are aligned and arranged not to be displaced from target positions in region in which an illumination pattern will be implemented.

Here, the area in which the illumination image is applied is the portion in which the light is emitted to the outside when the light is emitted. Since the guide unit 200 is provided with the resting portion 210 for fixing the position of the optical fiber 120 in an area where the illumination image is implemented, the position of the flexible optical fiber 120 is fixed and the illumination image to be projected is maintained.

The resting portion 210 includes a plurality of protrusions 210a. The resting portion 210 is arranged with the respective strands of the optical fiber 120 arranged between the plurality of protrusions 210a. As a result, each strand of the optical fiber 120 may be spaced apart between the plurality of protrusions 210a, and breakage is prevented as each strand is contacted as the spacing of each strand making up the optical fiber 120 is maintained. The plurality of protrusions 210a of the resting portion 210 are formed according to the direction of extension of each strand of the optical fiber 120.

The fixing unit 300 disposed at the second end portion 420 of the fixation bracket 400 is provided with a reflective portion 340 reflecting light so that the light enters an end portion of each of the optical fibers 120.

In various exemplary embodiments of the present invention, each of the first end portion 410 and the second end portion 420 of the fixation bracket 400 is provided with the fixing unit 300. That is, two fixing units 300 are required. The fixing unit 300 provided at the first end portion 410 of the fixation bracket 400 may be formed at the first end portion 410 of the fixation bracket 400 integrally as illustrated in FIG. 11. The fixing unit 300 provided at the second end portion 420 of the fixation bracket 400 may be mounted at the second end portion 420 of the fixation bracket 400 as a separate fixing unit as illustrated in FIG. 12.

The fixing unit 300 provided at the second end portion 420 of the fixation bracket 400 is provided with the reflective portion 340 from which light is reflected to be introduced into one end portion of each of the optical fibers 120. The reflective portion 340 is formed by depositing a reflective material on an end portion of the fixing unit 300, specifically at a portion with which one end portion of each of the optical fibers 120 is brought into contact. Thus, the optical fibers 120 illuminate when the light emitted from the light source 110 disposed at the first end portion 410 of the fixation bracket 400 is incident onto one end portion of the optical fiber 120. The incident light travels through the optical fiber 120 toward the opposite end portion, reflects off from the reflective portion 340 after reaching the opposite end portion of the optical fiber 120, and partially returns into the optical fiber. Therefore, the light loss is reduced, and the required amount of light is secured.

The optical fiber illumination apparatus structured as described above ensures high light efficiency and luminosity uniformity when lighting is performed with the optical fiber 120s, and various illumination patterns may be implemented with the flexible optical fibers 120.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An optical fiber illumination apparatus comprising:
   a light source module including a light source configured to emit light, and a group of optical fibers configured to transmit the light when the light emitted from the light source is incident onto the optical fibers;
   a guide unit extending in a longitudinal direction of the optical fiber illumination apparatus and configured to fix arrangement and positions of the optical fibers so that each of the optical fibers extends in the longitudinal direction and a predetermined illumination pattern is implemented by the group of optical fibers; and
   a fixing unit mounted between the light source module and the guide unit and configured to align the optical fibers wound around a circumferential external surface of the guide unit so that the optical fibers are spaced from each other.

2. The optical fiber illumination apparatus according to claim 1, wherein the light source module includes:
   a bracket on a first side of which the light source is installed; and
   a ferrule disposed on a second side of the bracket to face the light source so that an end portion of each of the optical fibers is sheathed into the ferrule to be fixed thereto.

3. The optical fiber illumination apparatus according to claim 2,
   wherein the bracket includes a first bracket portion and a second bracket portion, wherein each of the first and second bracket portions includes a first installation end portion that the light source is disposed and a second installation end portion which is bent from the first installation end portion and on which the ferrule is disposed,
   wherein when the first and second bracket portions are assembled to form the bracket, the second installation end portions of the first and second bracket portions are coupled to each other while surrounding and fixing the ferrule, and
   wherein the light source is disposed on the first installation end portion of the first and second bracket portions to face the ferrule.

4. The optical fiber illumination apparatus according to claim 2, wherein the ferrule has a cavity to allow the optical fibers to pass therethrough, and a through-hole is formed in a flank portion of the ferrule so that the through hole fluidically communicates with the cavity.

5. The optical fiber illumination apparatus according to claim 4, wherein, in a state in which the optical fibers are disposed in the cavity of the ferrule, the optical fibers are fixed in the cavity of the ferrule by an adhesive injected into the cavity through the through-hole.

6. The optical fiber illumination apparatus according to claim 1, wherein the guide unit has a resting portion on which the optical fibers are positioned and fixed in a region where the predetermined illumination pattern is to be displayed.

7. The optical fiber illumination apparatus according to claim 6, wherein the resting portion includes a plurality of protrusions, and the optical fibers are disposed between each of the plurality of protrusions.

8. The optical fiber illumination apparatus according to claim 1,
wherein the group of optical fibers includes a group of first optical fibers and a group of second optical fibers,
wherein the light source module includes a first light source, the group of first optical fibers onto which light emitted from the first light source is incident, a second light source, and the group of second optical fibers onto which light emitted from the second light source is incident, and
wherein each of the first optical fibers and each of the second optical fibers are wound around the guide unit in opposite directions to intersect each other.

9. The optical fiber illumination apparatus according to claim 8, wherein the guide unit is provided with a resting portion on which the first optical fibers and the second optical fibers are positioned and fixed in a region where the predetermined illumination pattern is to be displayed.

10. The optical fiber illumination apparatus according to claim 8, wherein the resting portion includes a plurality of fitting protrusions that are arranged side by side and extend in a direction in which the first optical fibers extend, defining accommodation grooves between the fitting protrusions so that the first optical fibers are disposed in respective accommodation grooves.

11. The optical fiber illumination apparatus according to claim 10,
wherein each of the plurality of fitting protrusions is provided with a plurality of recesses that are spaced from each other and recessed from the accommodation grooves and in which the second optical fibers are to be disposed, respectively.

12. The optical fiber illumination apparatus according to claim 11, wherein the accommodation groves defined between each of the fitting protrusions and the recesses formed on the fitting protrusions have a depth equal to or greater than a diameter of the first optical fibers, and a height difference between the accommodation grooves and the recesses is equal to the diameter of the first optical fibers.

13. The optical fiber illumination apparatus according to claim 1, wherein the guide unit is mounted with a joint bracket which is disposed in a region where the predetermined illumination pattern is not to be displayed and which is provided with multiple fixing holes into which respective end portions of the optical fibers are inserted.

14. The optical fiber illumination apparatus according to claim 1, wherein the fixing unit includes:
a fixing portion coupled to the guide unit and provided with insertion holes into which the optical fibers are respectively inserted; and
a cover portion provided to cover the fixing unit in a state in which an end portion of each of the optical fibers is inserted into a corresponding one of the insertion holes.

15. The optical fiber illumination apparatus according to claim 14, wherein the cover portion includes a first cap and a second cap, each being provided with an opening extending in a circumferential direction by a predetermined length so that the optical fibers pass through each opening.

16. The optical fiber illumination apparatus according to claim 14, wherein the fixing unit further includes a light shielding film disposed on the cover portion and configured to prevent light leaking from the optical fibers between the light source module and the fixing unit from being directed toward a receiving end portion of the guide unit.

17. The optical fiber illumination apparatus according to claim 1, wherein lengths of the optical fibers extending from the light source to the fixing unit are equal to each other.

18. An optical fiber illumination apparatus including:
a fixation bracket having a first end portion and a second end portion spaced apart from each other;
a light source module disposed at the first end portion of the fixation bracket and including a light source that emits light and a group of optical fibers that illuminate when the light emitted from the light source is incident onto the optical fibers;
a guide unit extending to be connected to the first end portion and the second end portion of the fixation bracket, configured to fix positions of the respective optical fibers, and configured to arrange positions of the optical fibers to form a predetermined illumination pattern; and
two fixing units arranged at the first end portion and the second end portion of the fixation bracket, respectively, and configured to fix the optical fibers so that the optical fibers are aligned and spaced from each other.

19. The optical fiber illumination apparatus according to claim 18, wherein the guide unit has a resting portion on which the optical fibers are positioned and fixed in a region where the predetermined illumination pattern is to be displayed, the resting portion including a plurality of protrusions.

20. The optical fiber lighting apparatus according to claim 18, wherein the fixing unit provided at the second end portion of the fixation bracket has a reflective portion for reflecting light at the first end portion thereof, the first end portion being in contact with an end portion of each of the optical fibers.

* * * * *